(12) United States Patent
Yoshida

(10) Patent No.: US 8,937,754 B2
(45) Date of Patent: Jan. 20, 2015

(54) IMAGE READING APPARATUS AND DRIVING APPARATUS

(71) Applicant: Canon Kabushiki Kaisha, Tokyo (JP)

(72) Inventor: Tsuyoshi Yoshida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/923,989

(22) Filed: Jun. 21, 2013

(65) Prior Publication Data

US 2014/0009800 A1    Jan. 9, 2014

(30) Foreign Application Priority Data

Jul. 5, 2012 (JP) ................................ 2012-151809

(51) Int. Cl.
  *H04N 1/04* (2006.01)
  *H04N 1/10* (2006.01)
(52) U.S. Cl.
  CPC ........... *H04N 1/1039* (2013.01); *H04N 1/1035* (2013.01)
  USPC ............ 358/497; 358/474; 358/494; 358/483
(58) Field of Classification Search
  USPC .......................... 358/497, 474, 494, 483, 482
  See application file for complete search history.

(56) References Cited

U.S. PATENT DOCUMENTS

| 8,081,356 B2 * | 12/2011 | Yamauchi ..................... 358/497 |
| 8,659,807 B2 * | 2/2014 | Hara et al. .................... 358/497 |
| 2008/0007799 A1 | 1/2008 | Takahara |
| 2012/0086991 A1 | 4/2012 | Hara et al. |

FOREIGN PATENT DOCUMENTS

| JP | 2008-015331 A | 1/2008 |
| JP | 2012-083457 A | 4/2012 |

* cited by examiner

*Primary Examiner* — Houshang Safaipour
(74) *Attorney, Agent, or Firm* — Fitzpatrick, Cella, Harper & Scinto

(57) ABSTRACT

An image reading apparatus comprises a moving unit on which a reading unit is mounted and which slides on a guide, and a driving unit mounted on the moving unit and includes a pinion gear meshing with a rack which extends in a scanning direction and is disposed between the pinion gear and the guide. A slide contact portion between the guide and the moving unit includes a first slide contact portion on the rack side and a second slide contact portion. The first slide contact portion includes a first surface being inclined so as to displace the moving unit toward the rack. The second slide contact portion includes a second surface preventing the moving unit from being displaced toward the rack.

14 Claims, 8 Drawing Sheets

IMAGE READING APPARATUS AND DRIVING APPARATUS

BACKGROUND OF THE INVENTION

1. Field of the Invention

The present invention relates to an image reading apparatus and a driving apparatus.

2. Description of the Related Art

An image reading apparatus such as an image scanner reads an original on a platen by moving a reading sensor along the platen. The reading sensor is mounted on a moving unit such as a carriage. The moving unit is configured to be movable by being guided by a guide member extending in the scanning direction. As a mechanism for moving the moving unit, a rack and pinion mechanism is known to be used.

When using the rack and pinion mechanism, wobbling occurs in the moving unit during scanning due to the reactive force that the pinion gear receives from the rack teeth and affects the quality of a read image in some case. Under the circumstance, a technique of suppressing such wobbling has been proposed (for example, Japanese Patent Laid-Open Nos. 2008-15331 and 2012-83457).

Japanese Patent Laid-Open No. 2008-15331 discloses a technique of suppressing wobbling by devising the position of a pinion gear and using the biasing force of a compression coil spring. Japanese Patent Laid-Open No. 2012-83457 discloses a technique of suppressing wobbling by engaging a concave engaging portion with a convex guide member. The concave engaging portion has two slide surfaces which form inclined surfaces.

An arrangement configured to suppress wobbling by biasing a carriage against a guide member by a compression coil spring and the like leads to an increase in the number of components, as disclosed in Japanese Patent Laid-Open No. 2008-15331. If two slide surfaces form inclined surfaces as disclosed in Japanese Patent Laid-Open No. 2012-83457, a moving potion may straddle a guide member due to the reactive force that the pinion gear receives from the rack teeth.

SUMMARY OF THE INVENTION

The present invention provides a technique of moving a moving unit more stably while suppressing an increase in the number of components.

According to the present invention, there is provided an image reading apparatus comprising: a reading unit which reads an original on a platen from a lower side of the platen; a guide extending in a scanning direction of the reading unit; a moving unit on which the reading unit is mounted and which slides on the guide; a rack extending in the scanning direction; and a driving unit which is mounted on the moving unit and includes a pinion gear meshing with the rack, wherein the rack is disposed between the pinion gear and the guide, a slide contact portion between the guide and the moving unit includes a first slide contact portion on the rack side and a second slide contact portion spaced more apart from the rack than the first slide contact portion, the first slide contact portion includes a first surface with one of the guide and the moving unit, the first surface being inclined so as to displace the moving unit toward the rack, and the second slide contact portion includes a second surface with one of the guide and the moving unit, the second surface preventing the moving unit from being displaced toward the rack.

Further features of the present invention will become apparent from the following description of exemplary embodiments (with reference to the attached drawings).

DESCRIPTION OF THE EMBODIMENTS

Figure 1:
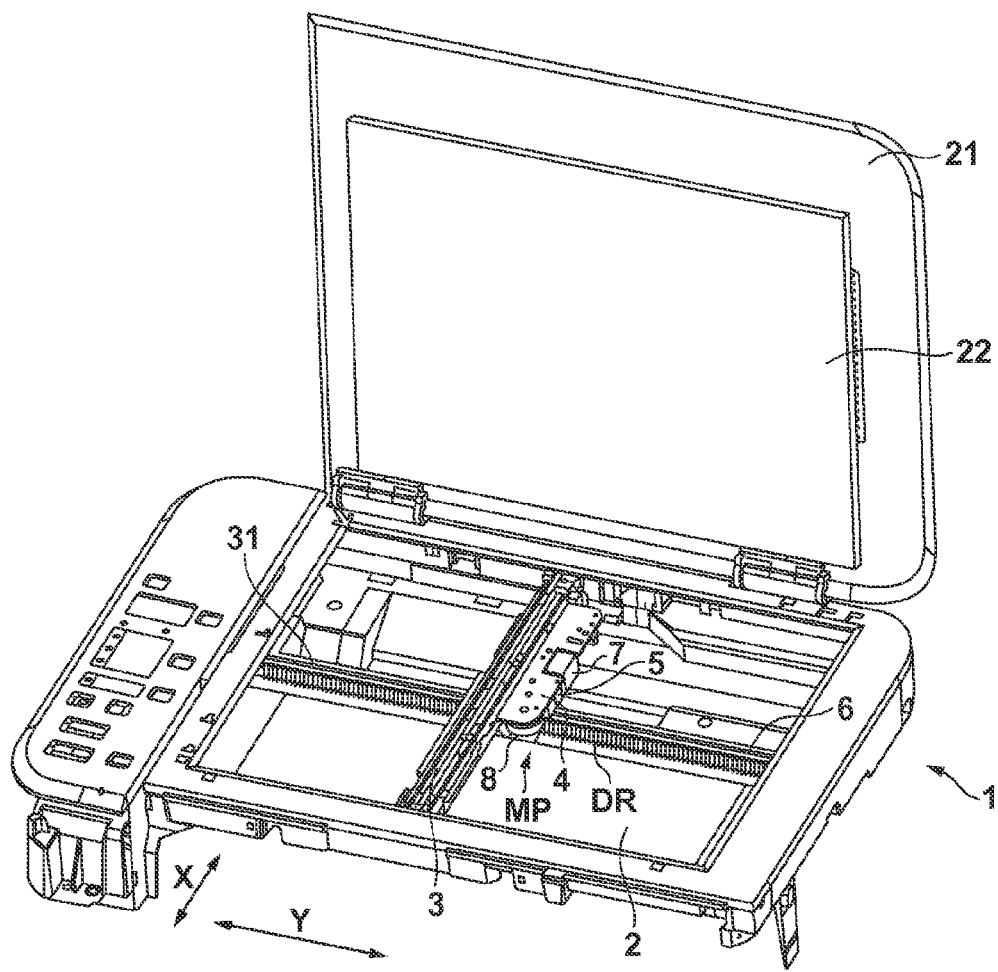
FIG. 1 is a perspective view showing a state in which the original cover of an image reading apparatus according to an embodiment of the present invention is open.
Figure 2:
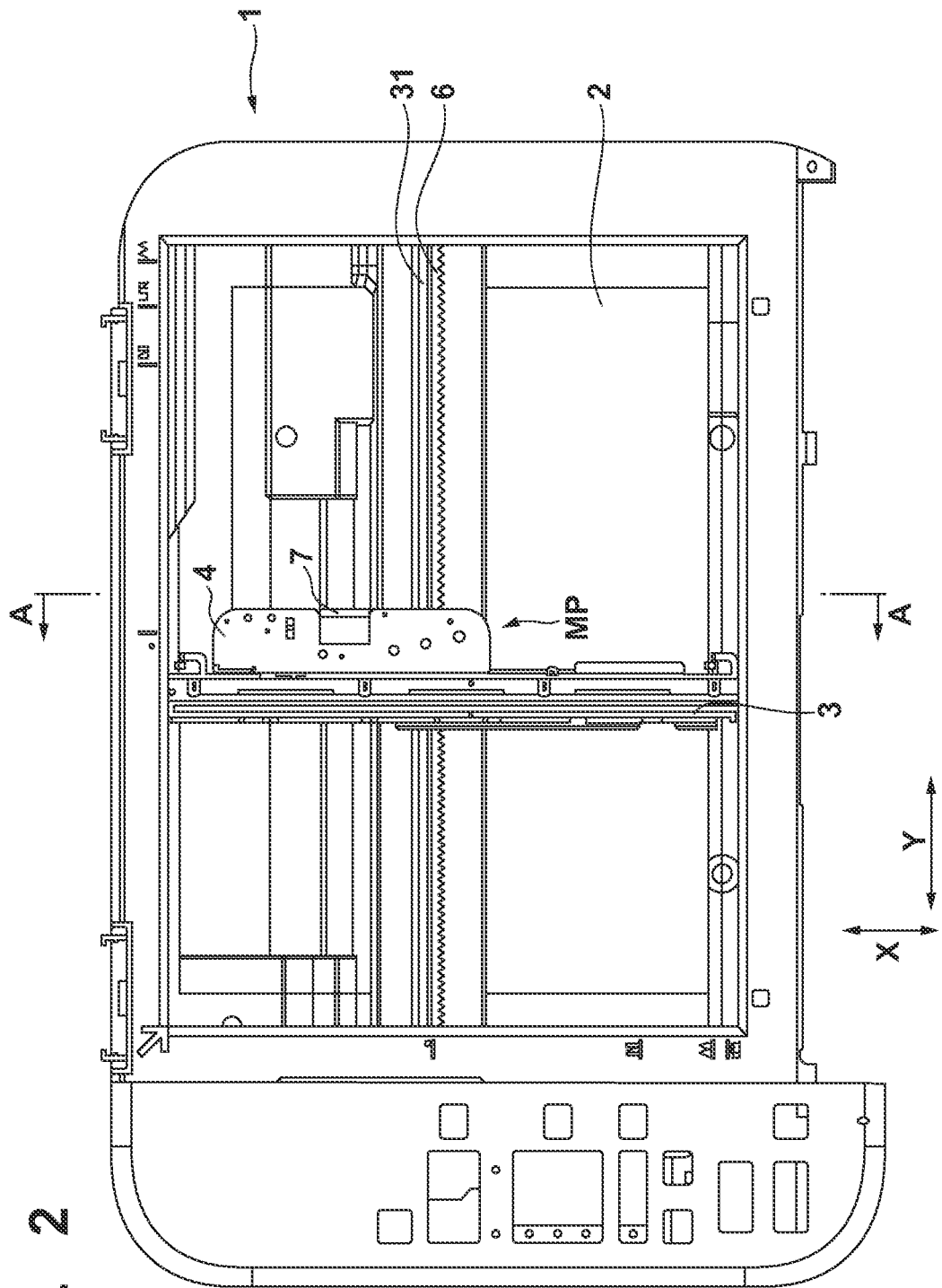
FIG. 2 is a plan view showing a state in which the original cover of the image reading apparatus in FIG. 1 is removed.

FIG. 1 is a perspective view showing a state in which an original cover 21 of an image reading apparatus 1 according to an embodiment of the present invention is open. FIG. 2 is a plan view showing a state in which the original cover 21 of the image reading apparatus 1 is removed. The image reading apparatus 1 is an apparatus which is part of a multifunctional peripheral and reads an original on the platen. The multifunctional peripheral has multiple functions such as a printing function and an original reading function.

The image reading apparatus 1 includes a platen 2 on which an original from which an image is to be read is placed. The platen 2 is formed from, for example, a glass plate. An original is set with its read surface being in contact with the platen 2.

The original cover 21 is provided so as to be capable of opening and closing the platen 2. The original cover 21 is a pressing member for pressing the original placed on the platen 2 against the upper surface of the platen 2. An original pressing sheet 22 formed from sponge and a sheet member provided on the surface of the sponge is bonded to the lower surface of the original cover 21 which serves as a pressing surface.

The image reading apparatus 1 incorporates a reading unit 3 which reads an original on the platen 2 from the rear surface side of the platen 2. The reading unit 3 can move in the arrow Y direction as a scanning direction along the lower surface of the platen 2. Note that X and Y indicate horizontal directions perpendicular to each other. The reading unit 3 includes a reading sensor. The reading sensor is, for example, a contact image sensor extending in the arrow X direction.

The reading unit 3 is mounted on a moving unit MP. The moving unit MP includes a carriage 4 which supports the reading unit 3 and a slider 5 fixed to the lower surface of the carriage 4. The slider 5 engages with a guide portion 31 and slides on the guide portion. The guide portion 31 is a guide rail member which extends in the Y direction and guides the movement of the moving unit MP. The moving unit MP can reciprocally move in the Y direction while sliding on the guide portion 31.

A rack portion 6 is provided so as to extend in the scanning direction of the reading unit 3. In this embodiment, the rack portion 6 extends parallel to the guide portion 31. In the embodiment, the guide portion 31 and the rack portion 6 are integrally formed. A driving unit DR is mounted on the moving unit MP. The driving unit DR includes a pinion gear 8 which meshes with the rack portion 6. Rotating the pinion gear 8 will move the moving unit MP in the Y direction. This can move the reading unit 3 in the Y direction.

The reading unit 3 reads an image on the lower surface of the original placed on the platen 2 by moving in the Y direction along the lower surface of the platen 2.

Figure 3:
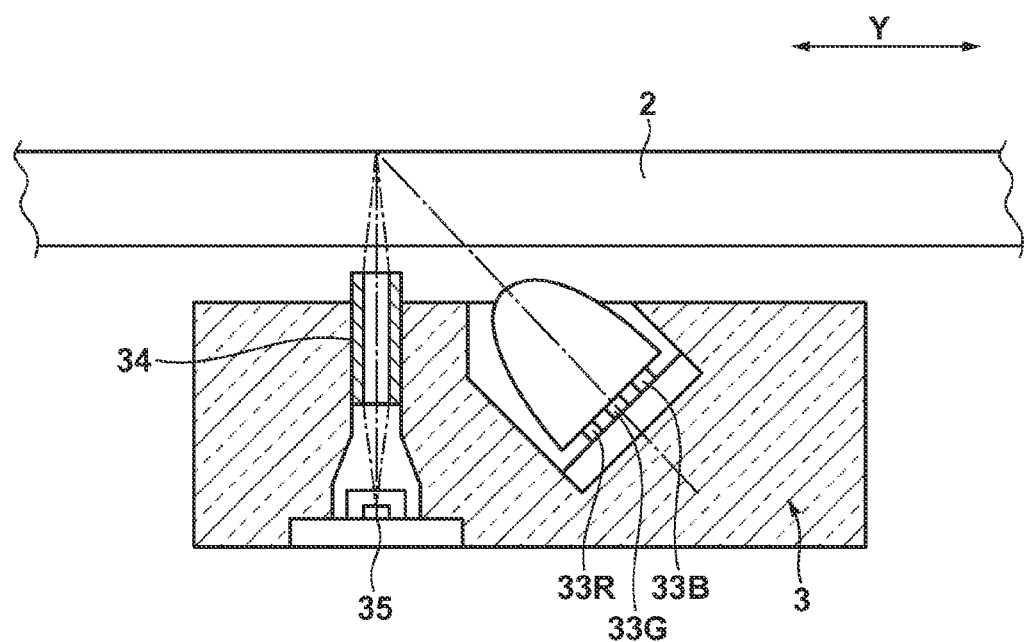
FIG. 3 is a view for explaining a reading unit.

FIG. 3 is a sectional view of the reading unit 3. The reading unit 3 incorporates light-emitting elements (LEDs) 33R, 33G, and 33B of three colors, a rod lens array 34, and a light-receiving element (image sensor) 35. The light emitted from the LEDs 33R, 33G, and 33B is reflected by an original surface. This reflected light is then formed into an image on the image sensor 35 by being transmitted through the rod lens array 34. The reading unit 3 sequentially switches and turns on the LEDs 33R, 33G, and 33B of three colors. The image sensor 35 then reads reflected light from the original for each color, thereby performing color separation reading.

Figure 4:
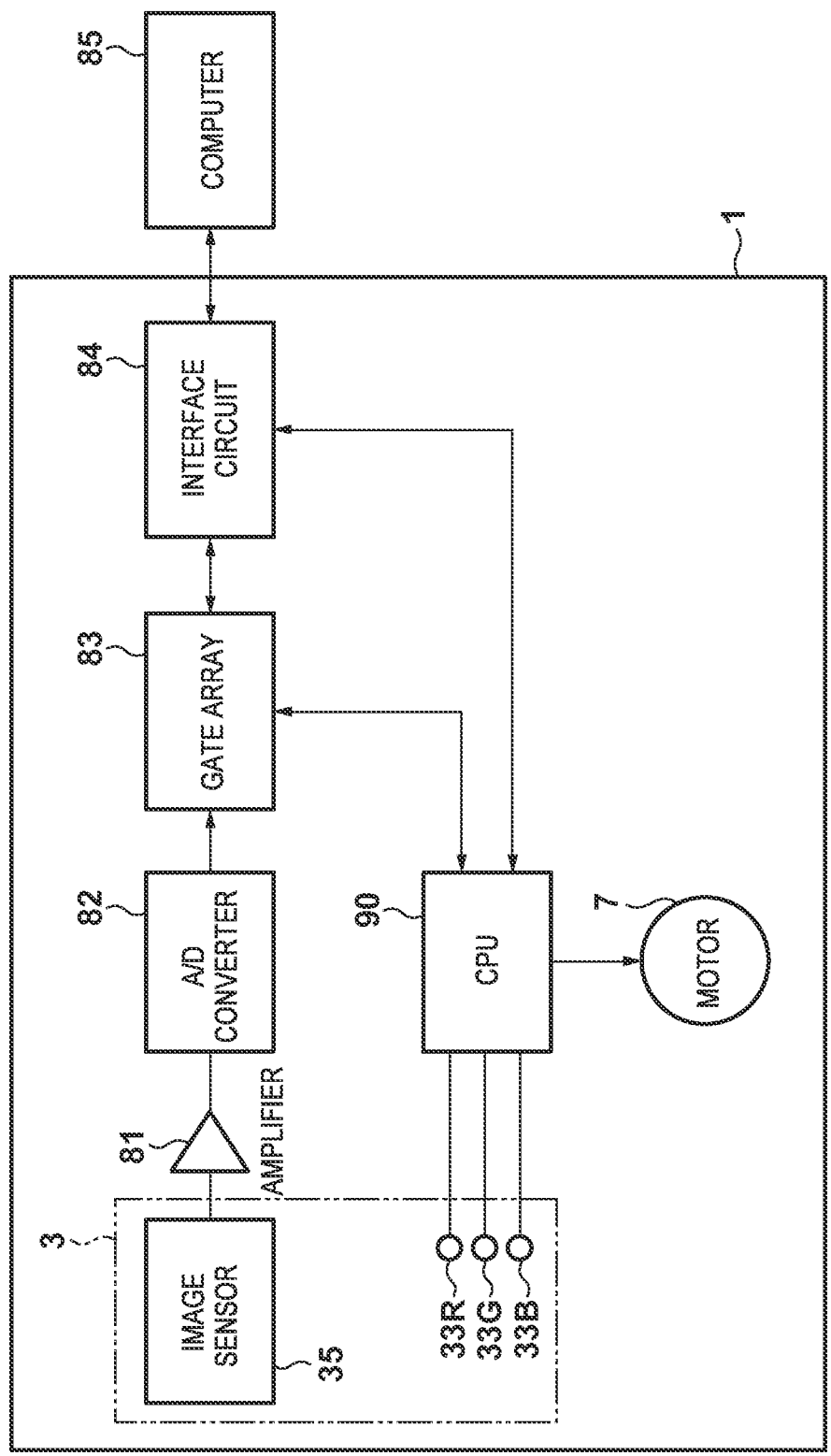
FIG. 4 is a block diagram of the control unit of the image reading apparatus in FIG. 1.

FIG. 4 is a block diagram of the control unit of the image reading apparatus 1. The image output signals read by the image sensor 35 in synchronism with the LEDs 33R, 33G, and 33B which are sequentially turned on are sent to an amplifier 81 to be amplified. An A/D converter 82 converts the amplified signals into digital image signals.

The A/D converter 82 divides the dynamic range of the image sensor 35 (the read output difference between the paper white portion and the jet black portion on an original) by the number of bits, and assigns the numbers of tones in accordance with brightness levels of an image on an original. For example, when using the A/D converter 82 with a resolution of 8 bits, it is possible to identify the interval from white to black into 256 tone levels. When using the 10-bit A/D converter 82, it is possible to identify the interval into 1024 tone levels. When using an 8-bit A/D converter 82, therefore, it is possible to identify 24 bits=about 16,700,000 colors by color reading with light sources of three colors, namely R, G, and B. In addition, in the case of a 10-bit A/D converter 82, it is possible to identify 30 bits=about 1,074,000,000 colors.

The image reading apparatus 1 can output image signals in a plurality of types of output forms. This makes it possible to select a suitable output form in accordance with the intended use of a read image. When reading a document and scanning it with an OCR or when reading a monochrome line drawing, monochrome binary images are suitable for such operation. Data used for such application is therefore the image data obtained by causing the image processing circuit incorporated in a gate array 83 to binarize, with a desired threshold, the image signal obtained by turning on only the G light source of the R, G, and B light sources described above.

When reading an image such as a photograph to output it to a monochrome printer, data to be used in this case is the image data obtained by binarizing an image signal, obtained by the G light source, by using halftone processing such as a dither matrix method or error diffusion method. When processing a color image, it is preferable to use multilevel (for example, 24-bit) image data. The above image signal processed by the image processing circuit can be output to a device such as a personal computer 85 via an interface circuit 84.

A CPU 90 controls the operation of the reading unit 3 and the operation of a drive source (a motor in this case) 7 mounted in the moving unit MP. An electric unit including the control board and power supply of the CPU 90 which performs above control operation is arranged in the image reading apparatus 1.

Figure 5:
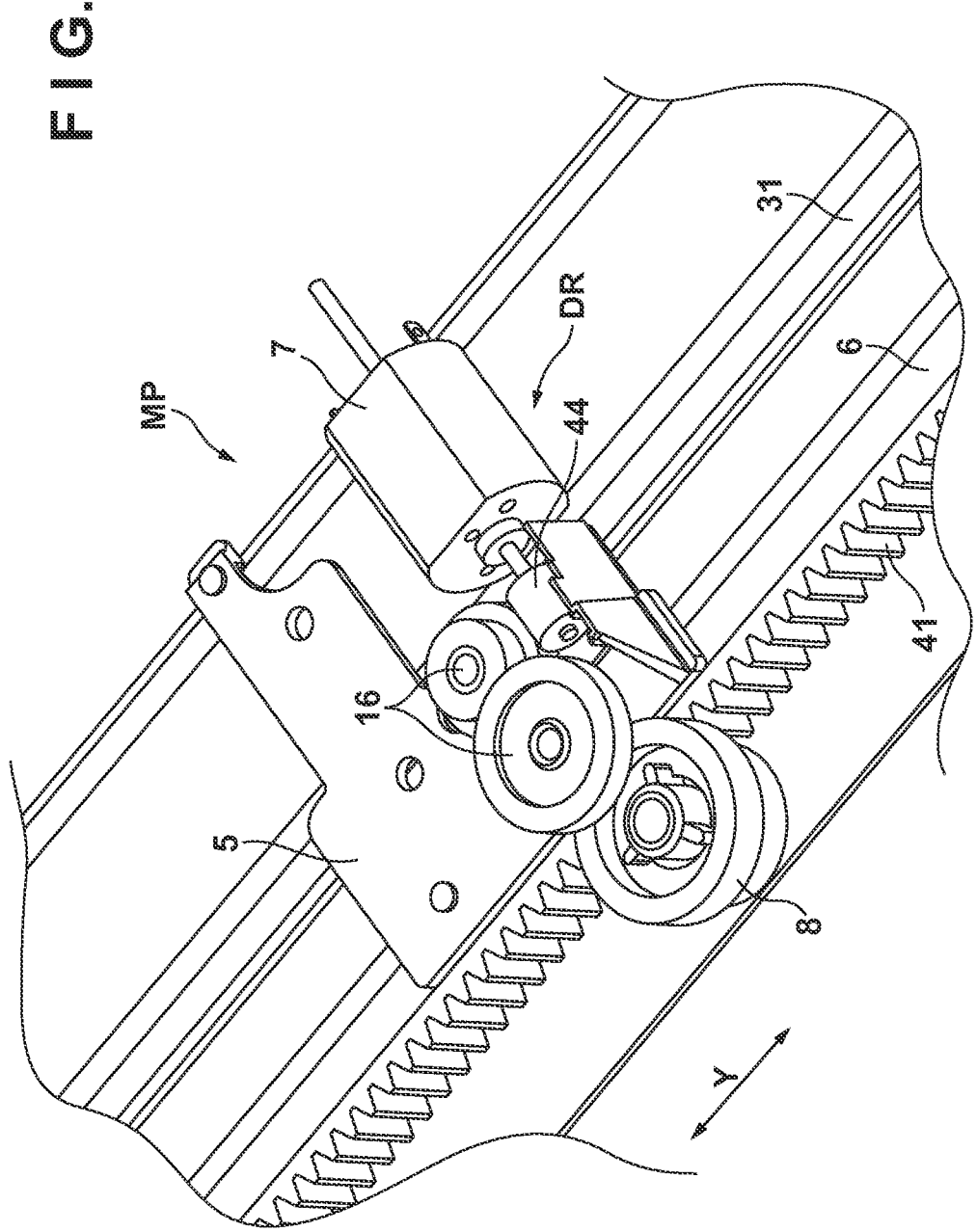
FIG. 5 is a view for explaining a mechanism near the moving unit.
Figure 6:
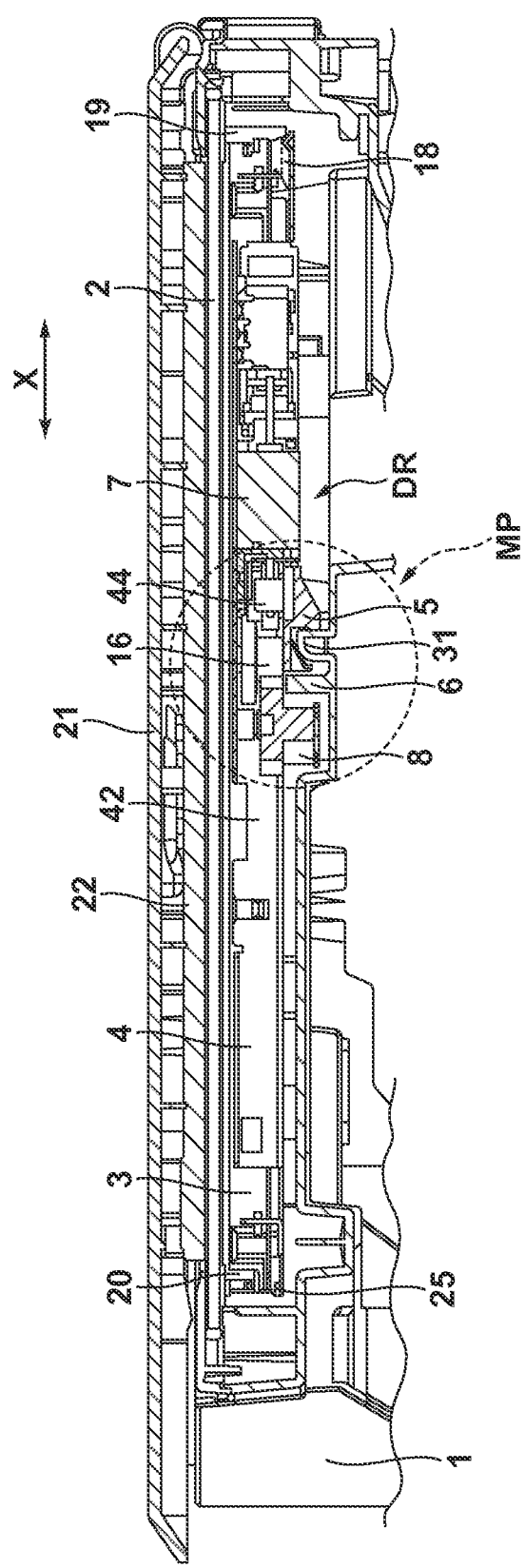
FIG. 6 is a cross-sectional view taken along a line A-A in FIG. 2.
Figure 7:
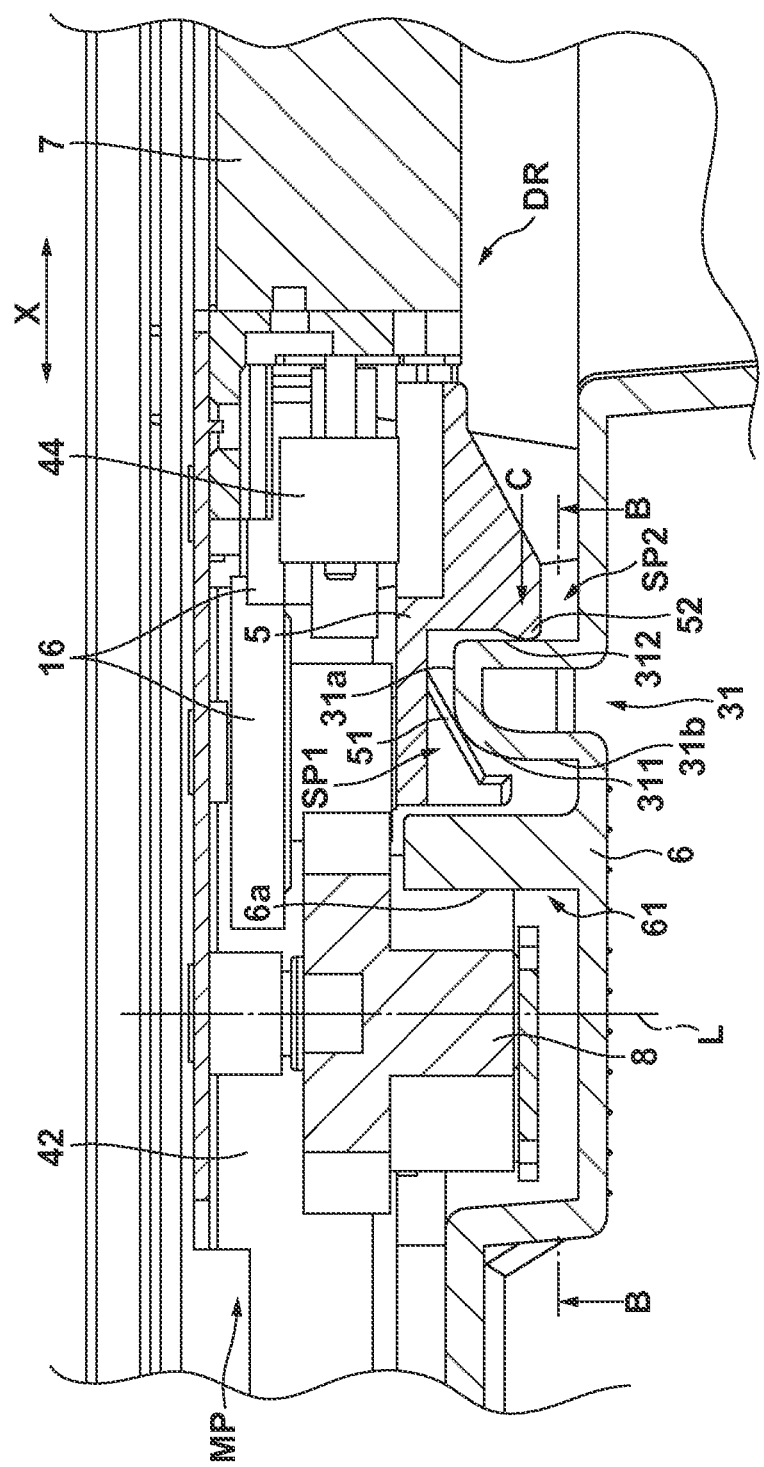
FIG. 7 is an enlarged view of a broken line circle portion in FIG. 6.
Figure 8:
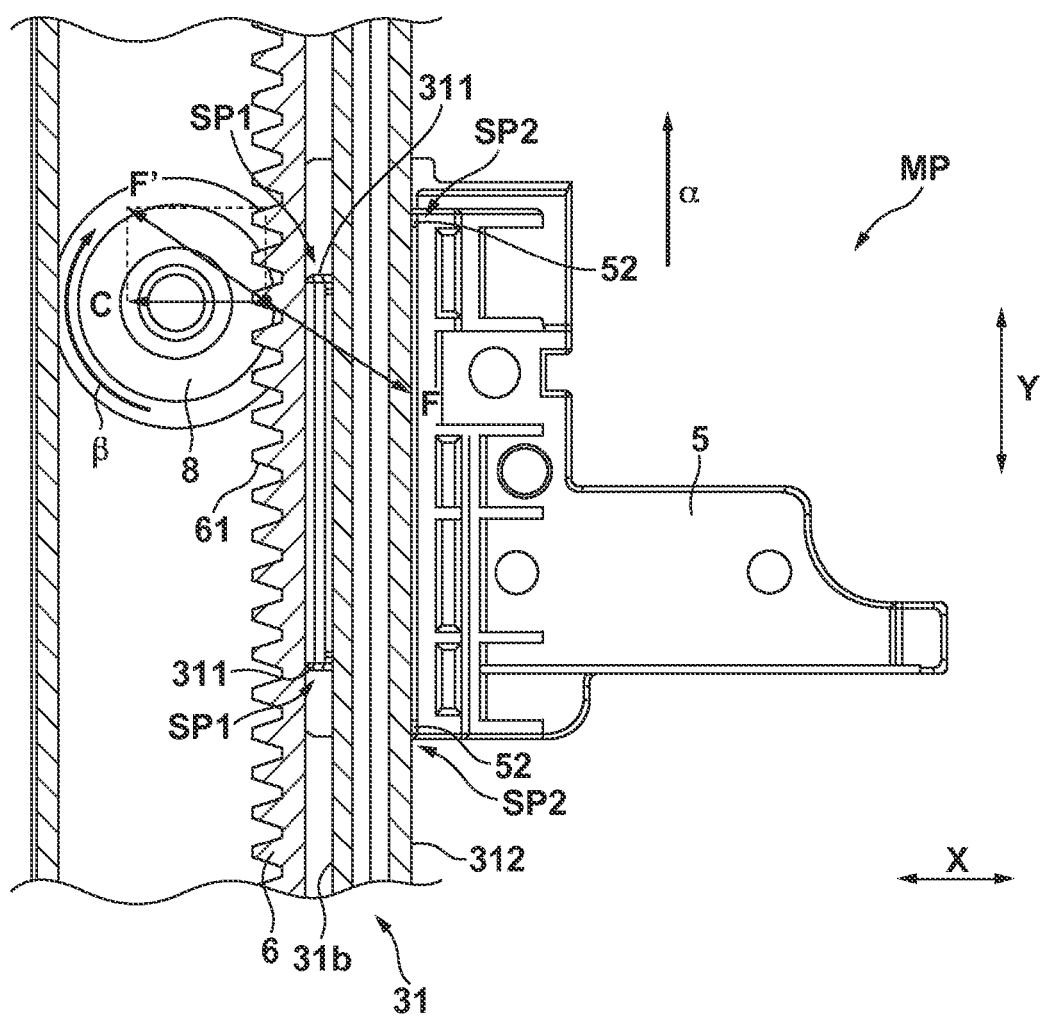
FIG. 8 is a sectional view taken along a line B-B in FIG. 7.

The driving unit DR and the sliding structure of a slider with respect to the guide portion 31 will be described next with reference to FIGS. 5 to 8. FIG. 5 is a view for explaining a mechanism around the moving unit MP, and shows a state in which the carriage 4 is removed. FIG. 6 is a cross-sectional view taken along a line A-A in FIG. 2. FIG. 7 is an enlarged view of a broken line circle portion in FIG. 6. FIG. 8 is a sectional view taken along a line B-B in FIG. 7.

Rack teeth 61 are formed on one side portion of the rack portion 6 almost throughout the length. The slider 5 and a support frame 42 are fixed on the lower surface of the carriage 4 (the surface on the opposite side to the platen 2). The motor 7 is mounted on the support frame 42. The driving unit DR rotates the pinion gear 8, which meshes with the rack teeth 61, through a motor gear (worm gear) 44 and idler gears 16 by using the motor 7 as a drive source. The pinion gear 8 and the idler gears 16 are axially supported on the support frame 42 so as to be rotatable.

Referring mainly to FIG. 5, the pinion gear 8 rotates upon meshing with the rack teeth 61 of the rack portion 6. With this rotating force, a driving force acts on the pinion gear 8. With this driving force, the moving unit MP moves in the scanning direction (Y direction). That is, when the motor 7 is driven in accordance with a command from the CPU 90 (FIG. 4), the driving force is transferred to the pinion gear 8 through the idler gears 16 to rotate the pinion gear 8. This rotating force then acts as a driving force to the rack portion 6. As a consequence, the reading unit 3 mounted on the carriage 4 reciprocally moves along the platen 2.

Referring mainly to FIG. 6, the reading unit 3 is mounted on the carriage 4. As shown in FIG. 6, spacers 19 and 20 are provided on the upper surfaces (located on the platen side) of the two end portions of the reading unit 3. The spacers 19 and 20 keep the distance to the lower surface (located on the reading unit 3 side) of the platen 2 constant to guarantee a focus position.

A biasing member (for example, a spring) 18 is loaded between the reading unit 3 and the carriage 4 at one end portion of the carriage 4 (the right end portion in FIG. 6). The biasing member 18 biases the reading unit 3 against the platen 2 (upper side). This biases the spacer 19 against the lower surface of the platen 2. As a counteraction, the pressure reactive force of the biasing member 18 biases one end portion (the right end portion in FIG. 6) of the carriage 4 downward.

A support portion 25 which abuts against the lower surface of the reading unit 3 is provided on the other end portion (the left end portion in FIG. 6) of the carriage 4. The other end portion (the left end portion in FIG. 6) of the reading unit 3 is biased (pressed) against the lower surface of the platen 2.

The slider 5 fixed on the lower surface of the carriage 4 is supported on the guide portion 31 at the intermediate portion of the carriage 4 in the X direction.

The reactive force that the carriage 4 receives from the biasing member 18 is held in equilibrium by the support reactive force acting on an abutment portion between the slider 5 and the guide portion 31 at the intermediate portion and the support reactive force acting from the platen 2 to the support portion 25 through the spacer 20. With the equilibrium between the forces acting at the three portions in this manner, the reading unit 3 is held in a predetermined posture on the carriage 4 while the spacers 19 and 20 on the two end portions are pressed against the lower surface of the platen 2. The slider 5 fixed on the lower surface of the carriage 4 is pressed and biased on the guide portion side (downward) by the reactive force of the force with which the biasing member 18 pushes up the reading unit 3 and the own weights of the reading unit 3 and carriage 4.

The sliding structure constituted by the slider 5 and the rack portion 6 will be described next with reference to FIGS. 7 and 8.

In this embodiment, the slide contact portion between the slider 5 and the guide portion 31 is broadly divided into first slide contract portions SP1 and second slide contact portions SP2 in structural terms. Although it is possible to additionally provide a slide contact portion having a different structure other than these portions, since an increase in the number of slide contact portions will increase the sliding load, this embodiment uses only the first slide contract portions SP1 and the second slide contact portions SP2.

The first slide contract portions SP1 and the second slide contact portions SP2 each are provided at two positions spaced apart from each other in the Y direction. Therefore, the total number of slide contact points with the slider 5 and the rack portion 6 is four. The first slide contract portions SP1 and second slide contact portions SP2 may each be three or more or one in number. In addition, they may differ in number. However, as in this embodiment, providing the first slide contract portions SP1 and the second slide contact portions SP2 each at two positions can reduce the number of slide contact points and sliding load while suppressing the rotation of the slider 5 around the vertical axis.

The rack portion 6 is disposed between the pinion gear 8 and the guide portion 31. In this embodiment, the pinion gear 8, the rack portion 6, and the guide portion 31 are sequentially arranged in the order named in a direction (that is, the X direction) perpendicular to a rotation axis L of the pinion gear 8 and the scanning direction (Y direction).

The first slide contract portions SP1 are located on the rack portion side, and the second slide contact portions SP2 are spaced more apart from the rack portion 6 than the first slide contract portions SP1 in the X direction.

Each first slide contract portion SP1 is constituted by a first slide contact surface 51 and a curved surface 311 abutting against the first slide contact surface 51. In this embodiment, the slider 5 has the first slide contact surface 51, and the guide portion 31 has the curved surface 311. However, the relationship between them may be reversed.

The first slide contact surface 51 is an inclined surface which is inclined from vertical and horizontal planes and is inclined especially in a direction in which the slider 5 is displaced toward the rack portion 6 (in the X and C directions). That is, the first slide contact surface 51 is shaped to receive a reactive force, from the guide portion 31, which includes a component in the direction in which the slider 5 approaches the rack portion 6.

The guide portion 31 includes an upper surface 31a, a first side surface 31b on the rack portion 6 side, and a second side surface 312 (second slide contact surface) on the opposite side to the first side surface 31b in the X direction, and has a convex sectional shape. The second side surface 312 abuts against a convex portion 52 to prevent the slider 5 from slipping off on the first slide contact surface 51 in the direction to approach the rack portion 6. The curved surface 311 is a corner portion connecting the upper surface 31a to the first side surface 31b and is formed throughout the guide portion 31 in the longitudinal direction.

The curved surface 311 has an arcuated outer shape in the Y direction, and hence comes into point or line contact with the first slide contact surface 51. It is possible to reduce sliding load by decreasing a contact area.

Each second slide contract portion SP2 is constituted by the second slide contact surface 312 and the protruding portion 52 which abuts against the second slide contact surface 312. In this embodiment, the guide portion 31 has the second slide contact surface 312, and the slider 5 has the protruding portion 52. However, the relationship between them may be reversed.

In this embodiment, the second slide contact surface 312 forms a vertical plane perpendicular to the X direction. In other words, the second slide contact surface 312 is parallel to tooth tip surfaces 6a of the rack teeth 61. The second slide contact surface 312 is formed throughout the guide portion 31 in the longitudinal direction. The protruding portion 52 protrudes toward the rack portion 6 (X and C directions) and has a spherical distal end. For this reason, the protruding portion 52 comes into point contact with the second slide contact surface 312. It is possible to reduce sliding load by decreasing a contact area.

Referring to FIG. 8, an arrow a indicates the moving direction (outward direction) of the moving unit MP at the time of original reading, and an arrow β indicates the rotating direction of the pinion gear 8 at the time of original reading. A force F acts from the pinion gear 8 to the rack teeth 61 at each meshing point in the pressure angle direction, and the pinion gear 8 receives a reactive force F' of the force F. The X-direction component of the reactive force F' presses the slider 5 in the direction indicated by an arrow C in FIG. 7. Note that even when the pinion gear 8 rotates reversely to the arrow p, the slider 5 is pressed in the direction indicated by the arrow C.

As a result, the protruding portion 52 always abuts against the second slide contact surface 312 to maintain a contact state. Since the second slide contact surface 312 is a flat surface perpendicular to the C direction, a pressing force in the C direction does not act to cause the slider 5 to straddle the guide portion 31. This can move the moving unit MP more stably.

A force pressing the slider 5 in the C direction acts regardless of the rotating direction of the pinion gear 8. For this reason, even if an impact acts on the image reading apparatus 1 to unintentionally rotate the pinion gear 8 at the time of the physical distribution of the image reading apparatus 1, a force pressing the slider 5 in the C direction acts on it. This makes it possible to maintain the amount of meshing between the pinion gear 8 and the rack teeth 61 at a predetermined amount. This can prevent the meshing between them from being released and causing the moving unit MP to slip off.

In this embodiment, as shown in FIG. 8, at the time of original reading, the second slide contact portions SP2 at the two positions are located such that the pressure angle direction (F-F' direction) passes through the second slide contact portions at the two positions. Considering the moment produced by the reactive force F' around one second slide contact portion SP2, a pressing force in the C direction in FIG. 7 acts on the protruding portion 52 at the other second slide contact portion SP2.

Considering, for example, a moment around the second slide contact portion SP2 on the upper side in FIG. 8, the moment rotates the slider 5 clockwise, and the protruding portion 52 is biased against the second slide contact surface 312 at the second slide contact portion SP2 on the lower side. In contrast to this, considering a moment around the second slide contact portion SP2 on the lower side, the moment rotates the slider 5 counterclockwise, and the protruding portion 52 is biased against the second slide contact surface 312 at the second slide contact portion SP2 on the upper side. As a consequence, at the time of original reading, in particular, the protruding portion 52 is always abuts against the second slide contact surface 312 to maintain a contact state. This makes it possible to further stably move the moving unit MP.

On the other hand, since the first slide contact surface 51 is an inclined surface, the slider 5 is displaced toward the rack portion 6 to make the protruding portion 52 abuts against the second slide contact surface 312 and attain an equilibrium state at a predetermined position. This can maintain the moving unit MP at a proper position.

In this manner, this embodiment can further stably move the moving unit MP. Since the principle of this operation is based on the arrangement of the first slide contact surface 51 and second slide contact surface 312, the number of components does not increase.

Note that as described above, the slider 5 is pressed and biased toward the guide portion 31 by the reactive force of the force with which the biasing member 18 pushes up the reading unit 3 and the own weights of the reading unit 3 and carriage 4. Since the first slide contact surface 51 is an inclined surface, a component force of this pressing force makes it easy for the slider 5 to be displaced toward the rack portion 6.

Although it is not essentially necessary to use the reactive force of the biasing member 18, letting the reactive force of the biasing member 18 act can maintain the moving unit MP at a proper position more reliably. The biasing member 18 is originally used to bias the reading unit 3, and hence the use of the reactive force of the biasing member 18 does not lead to a substantial increase in the number of components.

Although the above embodiment has exemplified the image reading apparatus, the application field of the present invention is not limited to this. The present invention can be applied to various types of driving apparatuses which move moving units on which objects to be moved are mounted by using rack pinion mechanisms.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2012-151809, filed Jul. 5, 2012, which is hereby incorporated by reference herein in its entirety.

What is claimed is:

1. An image reading apparatus comprising:
   a reading unit which reads an original on a platen from a lower side of the platen;
   a guide extending in a scanning direction of said reading unit;
   a moving unit on which said reading unit is mounted and which slides on said guide;
   a rack extending in the scanning direction; and
   a driving unit which is mounted on said moving unit and includes a pinion gear meshing with said rack,
   wherein said rack is disposed between said pinion gear and said guide,
   a slide contact portion between said guide and said moving unit includes a first slide contact portion on the rack side and a second slide contact portion spaced more apart from said rack than said first slide contact portion,
   said first slide contact portion includes a first surface with one of said guide and said moving unit, said first surface being inclined so as to displace said moving unit toward said rack, and
   said second slide contact portion includes a second surface with one of said guide and said moving unit, said second surface preventing said moving unit from being displaced toward said rack.

2. The apparatus according to claim 1, further comprising a biasing member which is provided on said moving unit and biases said reading unit against the platen side, wherein said moving unit is biased toward the guide side by a reactive force of said biasing member.

3. The apparatus according to claim 1, wherein a slide contract portion between said guide and said moving unit comprises only said first contact slide portion and said second slide contact portion.

4. The apparatus according to claim 1, wherein said first slide contact portions and said second contact portions each are provided at two positions so as to be spaced apart from each other in the scanning direction.

5. The apparatus according to claim 4, wherein said second slide contact portions at the two positions are positioned such that a pressure angle direction at a meshing point between said pinion gear and said rack passes through said second slide contact portions at the two positions.

6. The apparatus according to claim 1, wherein said guide includes an upper surface, a first side surface on the rack side, a second side surface on a side opposite to said first side surface in a direction orthogonal to the scanning direction, and a curved surface connecting said upper surface to said first side surface,
   said moving unit includes said first surface, with said curved surfaced of said guide slidely contacting said first surface, and
   said second side surface of said guide includes said second surface, with said moving unit including a protruding portion slidely contacting said second surface.

7. A driving apparatus comprising:
   a guide extending in a predetermined direction;
   a moving unit which slides on said guide;
   a rack extending in a direction in which said moving unit slides; and
   a driving unit which is mounted on said moving unit and comprises a pinion gear meshing with said rack,
   wherein said rack is disposed between said pinion gear and said guide,
   a slide contact portion between said guide and said moving unit includes a first slide contact portion on the rack side and a second slide contact portion spaced more apart from said rack than said first slide contact portion,
   said first slide contact portion includes a first surface with one of said guide and said moving unit, said first surface being inclined so as to displace said moving unit toward said rack, and
   said second slide contact portion includes a second surface with one of said guide and said moving unit, said second surface preventing said moving unit from being displaced toward said rack.

8. The apparatus according to claim 1, wherein said second surface forms a vertical plane.

9. The apparatus according to claim 7, wherein said second surface forms a vertical plane.

10. A driving apparatus comprising:
    a guide extending in a first direction;
    a moving unit which moves along said guide;
    a member having teeth extending in the first direction;
    a driving unit having a motor and a gear meshing with said teeth to move said moving unit;
    a first slide contact portion of said guide and said moving unit, having a first surface with one of said guide and said moving unit, the first surface being inclined with respect a second direction which is perpendicular to the first direction; and
    a second slide contact portion of said guide and said moving unit, having a second surface with one of said guide and said moving unit, said second surface forming a vertical plane which is perpendicular to the second direction.

11. The apparatus according to claim 10, wherein said guide includes side surfaces and a curved surface on an upper side, and said moving unit has the first surface slidely contacting with the curved surface of said guide, and said moving unit has a protruding portion slidably contacting with one of the side surfaces of said guide.

12. The apparatus according to claim 11, wherein said guide and said member are integrally formed as one component and said driving unit is provided on the moving unit.

13. The apparatus according to claim 10, wherein contact at said first slide contact portion causes a biased force at said second slide contact portion to suppress displacement of said moving unit away from said guide in the second direction.

14. The apparatus according to claim 10, wherein said moving unit mounts an image sensor to read an original placed on a platen.

\* \* \* \* \*